United States Patent
Choo et al.

(10) Patent No.: US 8,322,625 B2
(45) Date of Patent: Dec. 4, 2012

(54) RFID TAG FOR METALLIC MATERIALS

(75) Inventors: Jae Yul Choo, Yongin (KR); Jeong Ki Ryoo, Daejeon (KR); Jin Kuk Hong, Hwaseong (KR)

(73) Assignee: LS Industrial Systems Co., Ltd., Anyang-si, Gyeonggi-do (KR)

( * ) Notice: Subject to any disclaimer, the term of this patent is extended or adjusted under 35 U.S.C. 154(b) by 63 days.

(21) Appl. No.: 12/720,411

(22) Filed: Mar. 9, 2010

(65) Prior Publication Data

US 2010/0230499 A1    Sep. 16, 2010

(30) Foreign Application Priority Data

Mar. 10, 2009  (KR) .................. 10-2009-0020424

(51) Int. Cl.
*G06K 19/06* (2006.01)
*G08B 13/14* (2006.01)
(52) U.S. Cl. ..................... 235/492; 340/572.1
(58) Field of Classification Search .............. 235/492; 340/572.1–572.9
See application file for complete search history.

(56) References Cited

U.S. PATENT DOCUMENTS

| 6,622,921 B2 * | 9/2003 | Altwasser et al. ............ 235/492 |
| 2010/0007569 A1 * | 1/2010 | Sim et al. ..................... 343/795 |

FOREIGN PATENT DOCUMENTS

| EP | 2056239 | 5/2009 |
| GB | 2428939 | 2/2007 |
| JP | 2005-167980 | 6/2005 |
| JP | 2006-211683 | 8/2006 |
| JP | 2007249620 | 9/2007 |
| JP | 2008-160821 | 7/2008 |
| WO | 2004/093249 | 10/2004 |
| WO | 2009/073742 | 6/2009 |

* cited by examiner

*Primary Examiner* — Jamara Franklin
(74) *Attorney, Agent, or Firm* — Lee, Hong, Degerman, Kang & Waimey

(57) ABSTRACT

The present disclosure relates to an RFID (Radio frequency identification) tag for metallic materials, including a dielectric substrate, a tag chip arrayed on the dielectric substrate for storing an object data, a feeding loop connected across the tag chip for forming an inner space, and a metallic radiator connected across the feeding loop for receiving an electromagnetic signal from outside.

11 Claims, 4 Drawing Sheets

|  | DEVELOPMENT TAG RECOGNITION SENSITIVITY [dBm] [MM Chip Generation 2] | | | |
|---|---|---|---|---|
| FREQUENCY [MHz] | CD [T=5mm] | CD [T=10mm] | DVD [T=9mm] | DVD [T=14mm] |
| 880 | -3.7 | -5.7 | -5.7 | -2.7 |
| 890 | -4.7 | -1.7 | -5.7 | -3.7 |
| 900 | -5.6 | -5.6 | -4.6 | -4.6 |
| 910 | -6.6 | -3.6 | -6.6 | -4.6 |
| 920 | -6.8 | -4.8 | -5.8 | -3.8 |
| 930 | -7.1 | -3.1 | -6.1 | -4.1 |
| 940 | -7.3 | -4.3 | -3.3 | -3.3 |
| 950 | -6.6 | -3.6 | -4.6 | -2.6 |
| 960 | -7 | -3 | -4 | -2 |

RFID TAG FOR METALLIC MATERIALS

CROSS-REFERENCE TO RELATED APPLICATIONS

Pursuant to 35 U.S.C. §119, this application claims the benefit of earlier filing date and right of priority to Korean patent application number 10-2009-0020424, filed on Mar. 10, 2009, the entire contents of which are incorporated by reference in its entirety.

BACKGROUND OF THE DISCLOSURE

1. Field

The present disclosure relates to an RFID (Radio Frequency Identification) tag that is attached to a metal plate including a dielectric substrate, a tag chip, a feeding loop and a metallic radiator.

2. Background

Generally, an RFID (Radio Frequency Identification) technique is a technique for identifying a data carrier by using a radio wave without contact. With this technique, a tag (RFID tag) in which an IC chip and an antenna are embedded is attached to an object or a person, a device called an RFID reader/writer, and the RFID tag make a communication by using a radio wave, and the RFID reader/writer reads information stored in the IC chip (RFID tag IC), whereby the object or the person is identified. The Radio frequency identification (RFID) tags are electronic devices that may be affixed to items whose presence is to be detected and/or monitored. To be more specific, the RFID system employs an RFID tag that is attached to a product to transmit detailed information, and an RFID transmitter/receiver capable of reading identification information stored in the RFID tag using an RF communication. The RFID tag transmits information using radio frequency communication by passing through an area positioned with the transmitter/receiver to provide a base for an effective control on logistics/distribution such as product distribution, assembly, price change and marketing.

An attenuation phenomenon of a surface current in an antenna that comes from a compensation current induced on a metal surface must be overcome for a metal tag antenna. The conventional technique has been developed to minimize the influence by the compensation current. A typical metal attaching tag antenna is provided in two structures, that is, one structure where a discrete space is obtained at a bottom surface of a dipole antenna into which a metal plate surface is inserted, and a patch antenna structure using a metal plate surface.

The reason of inserting a metal plate surface in the conventional antenna structure is to minimize an influence of compensation current induced by attachment of an actual metal plate using the discrete space. However, the conventional tag antenna suffers from disadvantages in that structure is dull due to metal plate and a soft object cannot be attached.

SUMMARY

It is an object of the present disclosure to provide an RFID (Radio frequency identification) tag that is attached to a metal plate including a dielectric substrate, a tag chip, a feeding loop and a metallic radiator.

In one general aspect of the present disclosure, an RFID (Radio frequency identification) tag, comprising: a dielectric substrate; a tag chip arrayed on the dielectric substrate for storing an object data; a feeding loop connected across the tag chip for forming an inner space; and a metallic radiator connected across the feeding loop for receiving an electromagnetic signal from outside.

In some exemplary embodiments, the feeding loop may have a plurality of grid cell shapes.

In some exemplary embodiments, the metallic radiator may have a plurality of grid cell shapes.

In some exemplary embodiments, an inner space of the feeding loop may be set up in a first length and a second length satisfying predetermined reception sensitivity.

In some exemplary embodiments, the metallic radiator may form a straight line having a thickness along with the feeding loop, where the straight line may be set up in a length and a thickness satisfying predetermined reception sensitivity.

In some exemplary embodiments, a ratio of the first length in the inner space relative to the length of the straight line may be set up to satisfy predetermined reception sensitivity.

In some exemplary embodiments, a ratio of the second length in the inner space relative to the thickness of the straight line may be set up to satisfy predetermined reception sensitivity.

In some exemplary embodiments, both ends of the metallic radiator may be merged at a point in a space on the tag chip to allow the metallic radiator to form a part of an external fan-like arc.

In some exemplary embodiments, the feeding loop may function to match an electromagnetic signal received through the metallic radiator to the tag chip.

In some exemplary embodiments, the metallic radiator may be made of any one metal of aluminum or copper.

In some exemplary embodiments, the dielectric substrate may employ a PET substrate.

ADVANTAGEOUS EFFECTS

The RFID antenna system related to at least one of the exemplary embodiments according to the present disclosure thus configured is advantageous in that the tag for metallic materials can be manufactured with a flexible material to obtain an easy manufacturability and to obviate the tag performance degradation when metallic materials are attached.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description, serve to explain the principle of the disclosure. In the drawings.

DETAILED DESCRIPTION

Figure 1:
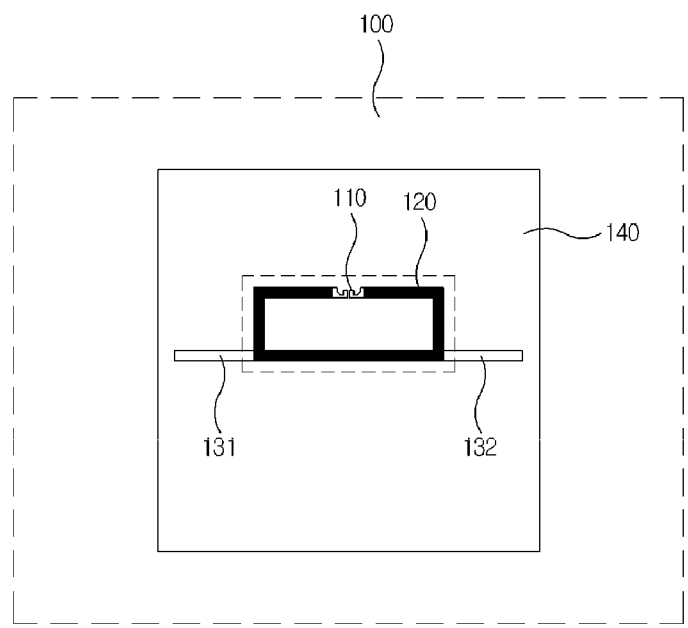
FIG. 1 is a block drawing of an RFID tag for metallic materials according to an exemplary embodiment of the present disclosure.

Hereinafter, exemplary embodiments of the present disclosure are described in detail with reference to the accompanying drawings. Detailed descriptions of well-known functions, configurations or constructions are omitted for brevity and clarity so as not to obscure the description of the present disclosure with unnecessary detail. Furthermore, the same reference numerals will be assigned to the same elements in the explanation of the figures.

FIG. 1 is a block drawing of an RFID tag for metallic materials according to an exemplary embodiment of the present disclosure.

Referring to FIG. 1, an RFID tag (100) for metallic materials may include a tag chip (110), a feeding loop (120), metallic radiators (131, 132) and a dielectric substrate (140).

The tag chip (110) modulates and demodulates an electromagnetic signal of a reader received from the feeding loop (120) to a direct current power source using a rectifier. The tag chip (110) may include a data of an object attached with the tag (100). The tag chip (110) may have an impedance value corresponding to a capacitance.

The feeding loop (120) transmits the electromagnetic signal to the tag chip (110). The feeding loop (120) functions to match the electromagnetic signal received through the metallic radiators (131, 132) to the tag chip, where the matching means an adjustment of conditions between one device and the other device when a signal or an energy is transmitted from said one device to said the other device, such that the signal or the energy can be most efficiently transmitted.

The feeding loop (120) has an impedance of inductance, and may be offset in correspondence with an impedance of capacitance of the tag chip (110). Furthermore, the feeding loop (120) may have a plurality of grid cell shapes. Because the feeding loop (120) has a plurality of grid cell shapes, a uniform current can flow in the tag (100) for metallic materials.

An inner space of the feeding loop (120) may be set up with a first length and a second length satisfying predetermined reception sensitivity. The inner space may have a rectangular shape, where a longer side of the rectangular inner space may be set up as a first length while a shorter side of the rectangular inner space may be set up as a second length. The first length or the second length of the inner space included in the feeding loop may be adjusted to adjust the reception sensitivity of the tag (100) for the metallic materials.

Therefore, the first and second lengths inside the space are adjusted in order to have a reception sensitivity catering to the set-up of the tag (100). The inner space is considered to have a rectangular shape according to an exemplary embodiment of the present invention, the longer lengthwise portion may be set up as a first length (a) and the shorter crosswise portion may be set up as a second length (b).

The metallic radiators (131, 132) receive an electromagnetic signal of an outside reader according to metallic radiating pattern. Furthermore, the plurality of metallic radiators (131. 132) may have a plurality of grid cell shapes. A uniform current can flow in the tag (100) because the metallic radiators (131, 132) are formed in a plurality of grid cell shape. Furthermore, the metallic radiators (131, 132) may be formed with aluminum or copper having a high conductivity.

The metallic radiators (131, 132) are connected across the feeding loop (120). The metallic radiators (131, 132) and the feeding loop (120) are formed on a straight line having a predetermined thickness. The straight line may be formed with a length and a thickness satisfying predetermined reception sensitivity. Therefore, the tag (100) may have the reception sensitivity catering to the set-up, and the length (l) or thickness (w) of the straight line may be adjusted.

The dielectric substrate (140) is provided with the tag chip (110), the feeding loop (120) and the metallic radiators (131, 132). The dielectric substrate (140) may be made of PET substrate having flexibility.

The electromagnetic signal received from the outside reader is received by a radial pattern via the metallic radiators (131, 132). The electromagnetic signal of the outside reader received by the metallic radiators (131, 132) is transmitted to the tag chip (110) via the feeding loop (120) functioning the matching. The tag chip (110) modulates and demodulates the electromagnetic signal to a direct current power using a rectifier.

Figure 2:
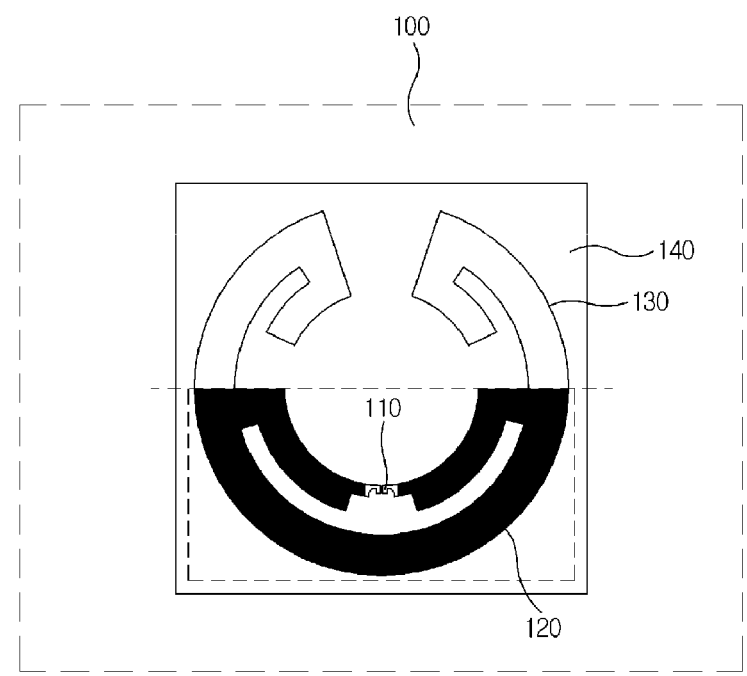
FIG. 2 is a block drawing of a ring-shaped RFID tag for metallic materials according to another exemplary embodiment of the present disclosure.

FIG. 2 is a block drawing of a ring-shaped RFID tag for metallic materials according to another exemplary embodiment of the present disclosure.

Referring to FIG. 2, the ring-shaped RFID tag (100) for metallic materials may include a tag chip (110), a feeding loop (120), a metallic radiator (130) and a dielectric substrate (140).

The ring-shaped tag (100) functions the same role as that of the tag according to the exemplary embodiment of the present invention. Both ends of the metallic radiator (130) are collected at a predetermined point in a space on the tag chip (110) to allow the metallic radiator (130) to form a part of external fan-shaped arc.

Therefore, the ring-shaped tag of FIG. 2 may be an equal model to the tag of FIG. 1. Because the feeding loop (120) forms a part of fan-shaped arc, an inner space of the feeding loop (120) also takes the shape of a fan.

In a case the inner space is formed with a rectangular shape, a portion of the arc with a longer axis may correspond to the first length (a), and a portion of radius with a shorter axis may correspond to the second length (b). Furthermore, the length of the straight line may correspond to the portion (l) of the fan-like arc, and the thickness of the straight line may correspond to the portion (w) of radius of the fan. The thick half moon-shaped feeding loop (120) has the structure of promoting induced current to be smoothly dispersed to the surrounding, such that the feeding loop (120) can have a structure of obtaining various paths of induced current necessary for metallic durability.

Figure 3:
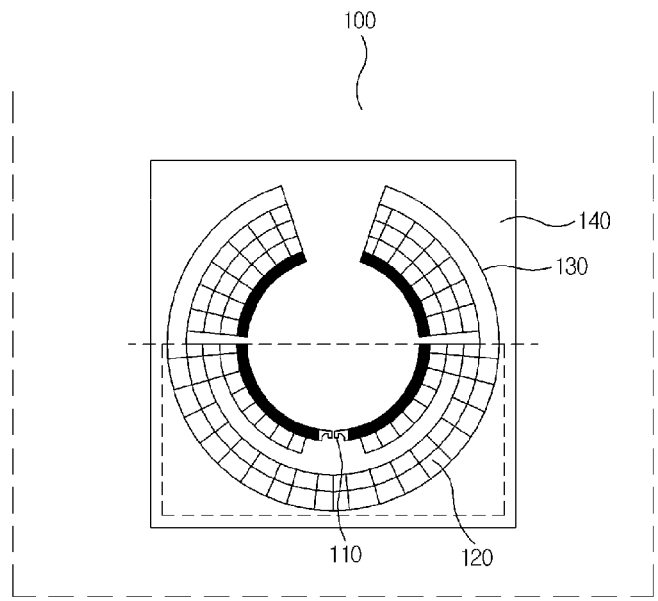
FIG. 3 is a block drawing of a ring-shaped RFID tag for metallic materials including grid cells according to another exemplary embodiment of the present disclosure.

FIG. 3 is a block drawing of a ring-shaped RFID tag for metallic materials including grid cells according to another exemplary embodiment of the present disclosure.

Referring to FIG. 3, a ring-shaped tag for metallic materials including the grid cell may include a tag chip (110), a feeding loop (120), a metallic radiator (130) and a dielectric substrate (140). Each of the feeding loop (120) and the metallic radiator (130) may take the shape of a grid cell, which allows the feeding loop (120) and the metallic radiator (130) to have a uniform current distribution. The grid cell may be applied with various shapes in addition to what is shown in FIG. 3.

In a case the inner space included in the tag is formed with a rectangular shape, a portion of the arc with a longer axis may correspond to the first length (a), and a portion of radius with a shorter axis may correspond to the second length (b). Furthermore, the length of the straight line may correspond to the portion (l) of the fan-like arc, and the thickness of the straight line may correspond to the portion (w) of radius of the fan.

Figure 4:
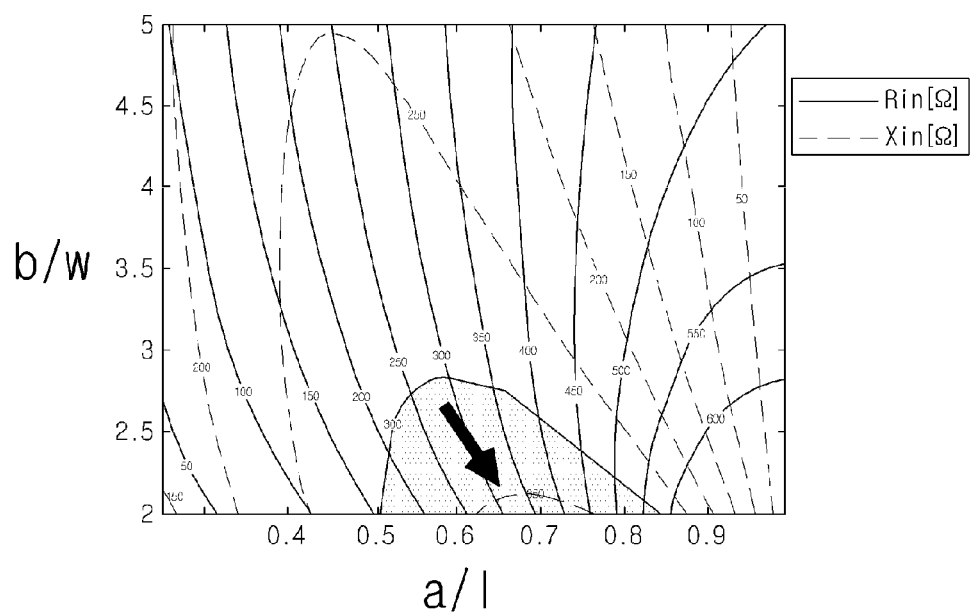
FIG. 4 is a schematic view illustrating reception sensitivity measured using an RFID tag for metallic materials according to an exemplary embodiment of the present disclosure.

FIG. 4 is a schematic view illustrating reception sensitivity measured using an RFID tag for metallic materials according to an exemplary embodiment of the present disclosure.

Referring to FIG. 4, a first length of the inner space is set up as "a", and a second length of the inner space is set up as "b". Furthermore, a length of the straight line is set up as "l", and a thickness of the straight line is set up as "w". The reception sensitivity of FIG. 4 may be determined by adjustment of length ratio. To be more specific, the reception sensitivity may be determined by adjusting a ratio of the first length (a) in the inner space relative to the length (l) of the straight line to 0.4:0.9.

In order to enter an area of reception sensitivity to be set up by a user, the ratio of the first length (a) in the inner space relative to the length (l) of the straight line to 0.5:0.8. Furthermore, a ratio of the second length (b) in the inner space relative to the thickness (w) of the straight line may be adjusted from 2 to 5 to thereby adjust the reception sensitivity.

In order to enter an area of reception sensitivity to be set up by a user, a ratio of the second length (b) in the inner space relative to the thickness (w) of the straight line may be adjusted from 2 to 3.

Figures 5A, 5B:
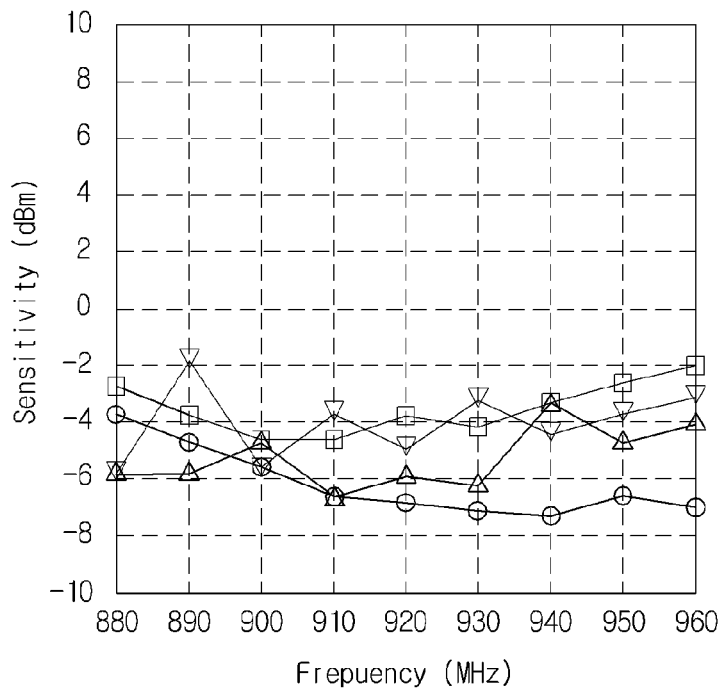
FIGS. 5a and 5b are schematic views illustrating reception sensitivity measured at a non-reflection chamber after a durable metallic tag is attached to various metals according to an exemplary embodiment of the present disclosure.

FIGS. 5a and 5b are schematic views illustrating reception sensitivity measured at a non-reflection chamber after a durable metallic tag is attached to various metals according to an exemplary embodiment of the present disclosure.

FIG. 5a illustrates a graph expressing a measurement result of reception sensitivity, and FIG. 5b illustrates a schematic view of a measurement result of reception sensitivity defined in a table.

Examples of various metals may include a 5 mm CD, a 10 mm CD, a 9 mm DVD and a 14 mm DVD.

Referring to FIGS. 5a and 5b, it could be noticed from the exemplary embodiment of the present invention that the tag shows a uniform recognition sensitivity within a scope of approximately −8 dB to −4 dB in the local frequency band in the range of 908.5 MHz to 914 MHz.

Figure 6:
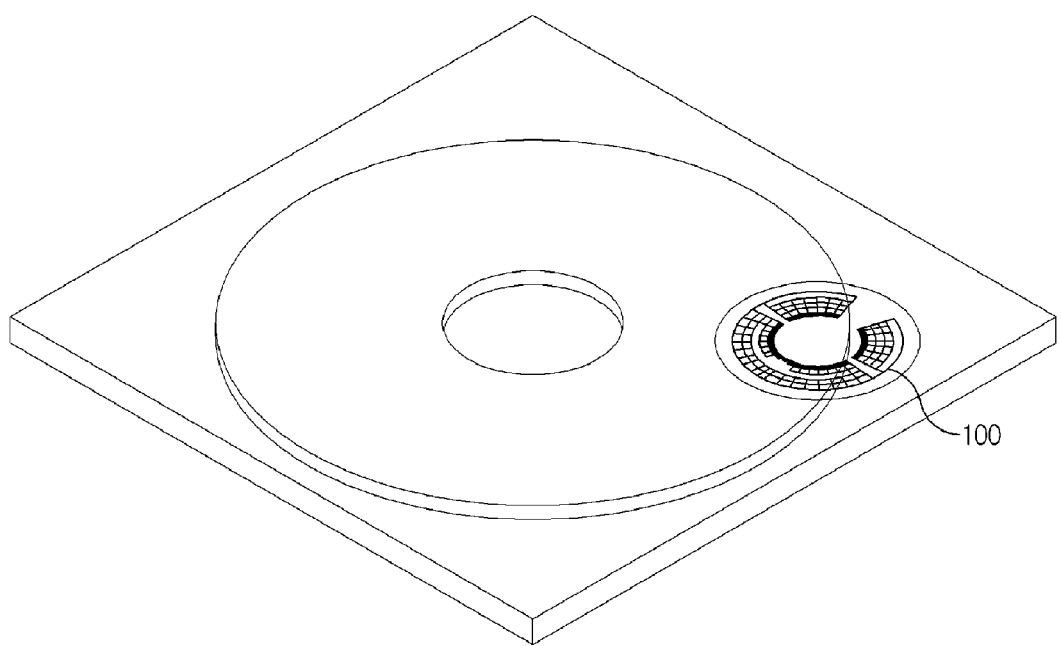
FIG. 6 is a schematic view illustrating an example where an RFID tag for metallic materials is attached to a metal according to an exemplary embodiment of the present disclosure.

FIG. 6 is a schematic view illustrating an example where an RFID tag for metallic materials is attached to a metal according to an exemplary embodiment of the present disclosure.

Referring to FIG. 6, the tag according to the exemplary embodiment of the present invention may be attached to a case including a metal to transmit a signal to or receive a signal from a reader. Furthermore, the tag may offset the induced current while being attached to the metal to transmit a signal to or receive a signal from a reader.

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

What is claimed is:

1. A radio-frequency identification (RFID) tag for metallic materials, the RFID tag comprising:
   a dielectric substrate;
   a tag chip positioned on an upper surface of the dielectric substrate and configured for storing object data;
   a feeding loop positioned on the upper surface of the dielectric substrate and connected across the tag chip to form an inner space; and
   a metallic radiator positioned on the upper surface of the dielectric substrate and connected across the feeding loop, the metallic radiator configured for receiving an electromagnetic signal from outside the RFID tag.

2. The RFID tag of claim 1, wherein the feeding loop comprises a plurality of grid cells.

3. The RFID tag of claim 1, wherein the metallic radiator comprises a plurality of grid cells.

4. The RFID tag of claim 1, wherein the inner space of the feeding loop comprises a rectangular shape having a first length and a second length, the first and second lengths configured to satisfy a predetermined reception sensitivity.

5. The RFID tag of claim 4, wherein the metallic radiator forms a straight line having a length and a thickness configured to satisfy the predetermined reception sensitivity.

6. The RFID tag of claim 5, wherein a ratio of the first length of the inner space relative to the length of the straight line is configured to satisfy the predetermined reception sensitivity.

7. The RFID tag of claim 5, wherein a ratio of the second length of the inner space relative to the thickness of the straight line is configured to satisfy the predetermined reception sensitivity.

8. The RFID tag of claim 1, wherein a first end and a second end of the metallic radiator are configured to merge at a point in a space above the tag chip to allow the metallic radiator to form a part of a fan-like arc.

9. The RFID tag of claim 1, wherein the feeding loop is configured to match an electromagnetic signal received through the metallic radiator to the tag chip.

10. The RFID tag of claim 1, wherein the metallic radiator comprises aluminum or copper.

11. The RFID tag of claim 1, wherein the dielectric substrate comprises a Polyethylene terephthalate (PET) substrate.

* * * * *